(12) United States Patent
Maroun

(10) Patent No.: US 7,205,980 B2
(45) Date of Patent: Apr. 17, 2007

(54) QUIET MOUSE

(76) Inventor: Maroun Gregory Maroun, 10640 Roedel Rd., Frankenmuth, MI (US) 48734

( * ) Notice: Subject to any disclaimer, the term of this patent is extended or adjusted under 35 U.S.C. 154(b) by 554 days.

(21) Appl. No.: 10/776,081

(22) Filed: Feb. 11, 2004

(65) Prior Publication Data

US 2005/0174323 A1  Aug. 11, 2005

(51) Int. Cl.
*G09G 5/08* (2006.01)
(52) U.S. Cl. ...................................... 345/163; 345/167
(58) Field of Classification Search ................ 345/156, 345/157, 161, 163–168
See application file for complete search history.

(56) References Cited

U.S. PATENT DOCUMENTS

| 4,364,035 A | 12/1982 | Kirsch |
|---|---|---|
| 4,390,873 A | 6/1983 | Kirsch |
| 4,514,726 A | 4/1985 | Whetstone |
| 4,922,236 A | 5/1990 | Heady |
| 4,939,324 A | 7/1990 | English |
| 5,298,918 A | 3/1994 | Yen-Chen |
| 5,710,397 A | 1/1998 | Liao |
| 5,950,810 A | 9/1999 | Pan |
| 6,195,082 B1 | 2/2001 | May |
| 6,933,925 B1 | 8/2005 | Gibbons |
| 2005/0062719 A1* | 3/2005 | Hinckley et al. ........... 345/163 |

FOREIGN PATENT DOCUMENTS

| JP | 10333826 | 12/1998 |
|---|---|---|
| JP | 2000148388 A | 10/2000 |
| KR | 2001001783 | 1/2001 |

OTHER PUBLICATIONS

International Search Report dated Nov. 16, 2006.

* cited by examiner

*Primary Examiner*—Ricardo Osorio
(74) *Attorney, Agent, or Firm*—Carlson, Gaskey & Olds

(57) ABSTRACT

A computer pointing device includes an interface for communicating to a computer in response to a user input. The pointing device includes an inaudible moveable input that is activated by the user. The pointing device includes a resilient member with at least one electrical contact. The moveable input cooperates with the resilient member to engage and disengage the electrical contact from an interface electrical contact. Engagement between the electrical contacts is silent or inaudible in response to user input to the moveable input. The pointing device also includes a switching mechanism that converts the inaudible engagement of the electrical contacts into an audible engagement.

13 Claims, 3 Drawing Sheets

QUIET MOUSE

BACKGROUND OF THE INVENTION

The present invention generally relates to a computer pointing device that translates the motion of a user's hand into signals interpreted by a computer, and more particularly to a computer pointing device that includes an inaudible moveable input activated by a user.

Pointing devices, such as a mouse for example, have two primary functions. The pointing device is used to translate the motion of the user's hand into signals that the computer can identify, which is typically referred to as "pointing." The pointing device is also used to send user selection criteria from the user to the computer, which is typically referred to as "clicking."

In a typical "pointing" application for a mouse, the translation is accomplished by using components such as: a ball, a set of rollers, a shaft/disk assembly, an infrared assembly comprised of an infrared LED and infrared sensor, and an on-board processor chip. These components are mounted within a housing. The housing includes a moveable input, such as a button, which cooperates with the other mouse components in response to a user input.

In one configuration, the pointing is accomplished by rolling the ball, which is in contact with the desktop and the rollers. The set of rollers includes a first roller that contacts the ball to translate the x-component of the rolling motion into linear motion and a second roller, typically set 90° apart from the first roller, contacts the ball to translate the y-component of the rolling motion into linear motion. Each roller is connected to a shaft, which spins a disk having a series of holes. The infrared LED and infrared sensor are located on either side of the disk. The holes in the disk break a beam of light coming from the LED such that the infrared sensor sees pulses of light. The rate of the pulsing is directly related to the speed of the mouse and the distance the mouse travels. The on-board processor chip then reads the pulses from the infrared sensors, translating them into binary data that the computer can understand.

Once the mouse has been used to "point" to a desired location, "clicking" is employed. "Clicking" occurs when the user presses and releases an input on the top of the mouse. A small fixed protrusion on the internal face of the button actuates a spring which comprises an electrical contact. When a button is pressed, the spring electrical contact breaks the signal path. When the button is released, the spring electrical contact closes the signal path, indicating a user selection or relocating the cursor to the users newly chosen position.

An optical version of the traditional "wheeled" mouse replaces the "wheeled" translation componentry of the traditional mouse with a tiny camera that takes approximately 1,500 pictures every second. The optical mouse offers several advantages over the traditional "wheeled" mouse. For example, the optical mouse has no moving parts, which means less wear, a lower chance of failure, and increased tracking for a smoother response. However, both the optical mouse and the traditional "wheeled" mouse have an audible "click" when the user actuates an input. This audible "click" can be objectionable to the user and/or to others in the near vicinity. This "click" can be especially objectionable, when the application the user is running requires multiple or successive user inputs, for example when the user is playing a computer game. Accordingly, it is desirable to provide a "clickless" or inaudible mouse that offers the user a variable click, or a choice of click or no click.

SUMMARY OF THE INVENTION

A computer pointing device according to the present invention includes an inaudible moveable input that is activated or controlled by a user. This allows the computer pointing device to silently communicate user commands to a computer.

In one disclosed embodiment, the computer pointing device includes an interface that communicates the user input to a computer, and which includes at least one interface electrical contact. The device also includes at least one resilient member with a resilient member electrical contact that selectively engages the interface electrical contact. The moveable input member cooperates with the resilient member to selectively engage and disengage the interface and resilient member electrical contacts. Engagement and disengagement of the electrical contacts from each other is inaudible.

In another disclosed embodiment, the computer pointing device includes a switch mechanism that allows the user to switch between inaudible and audible modes of operation. The switch is operably coupled to the moveable input member, and includes a guide that cooperates with the input member to move the input member relative to the resilient member. The switch moves the input member closer to the resilient member electrical contact in the inaudible mode, and moves the input member further away from the resilient member electrical contact in the audible mode.

The present invention provides the user with a computer pointing device that can operate in an inaudible mode, and which offers the option of switching between audible and inaudible modes. These and other features of the present invention can be best understood from the following specification and drawings, the following of which is a brief description.

DETAILED DESCRIPTION OF THE PREFERRED EMBODIMENT

Figure 1:
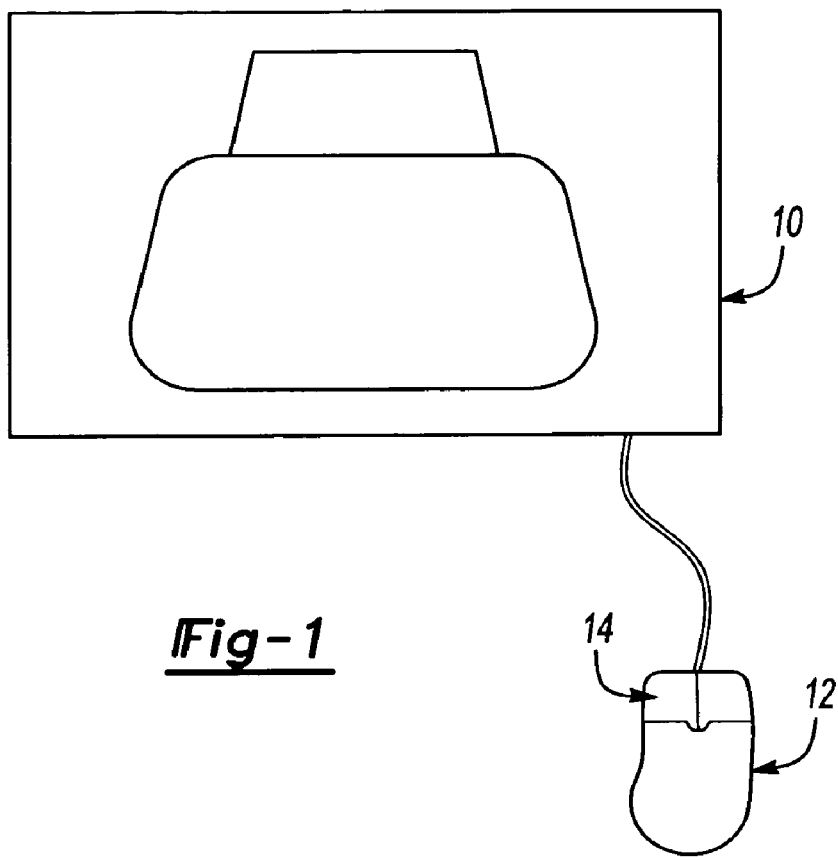
FIG. 1 illustrates a schematic view of a computer including a computer pointing device incorporating the present invention.

FIG. 1 illustrates a schematic view of a computer 10 incorporating a computer pointing device 12 of the present invention. The computer pointing device 12 includes an inaudible, moveable input 14 that is in communication with the computer 10. In one disclosed embodiment, the computer input device 12 is a computer mouse and the moveable input 14 comprises a button, tab, or other similar structure. The computer input device 12 translates motion of a user's hand into signals that can be read by the computer 10. This hand motion and associated computer translation is referred to as "pointing." User tactile input to the moveable input sends user selection criteria from the user to the computer 10 and is referred to as "clicking."

Figure 2:
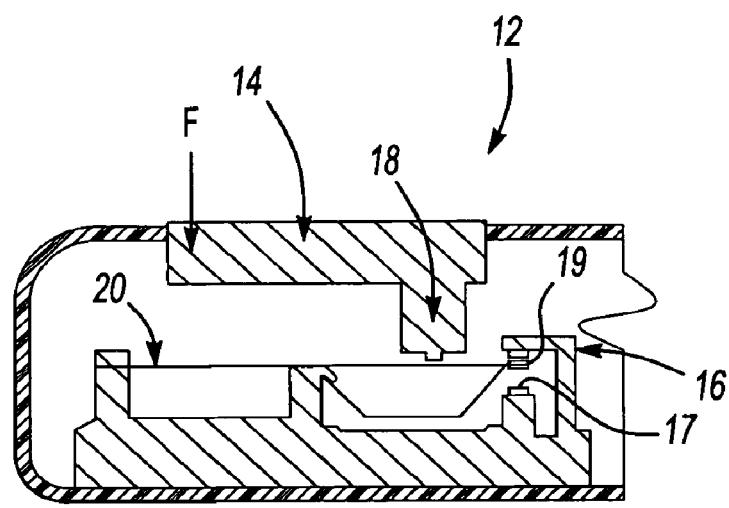
FIG. 2 illustrates a side view, partially cut-away, of one embodiment of a computer pointing device incorporating the subject invention.

FIG. 2, illustrates a side-view, partially cut-away, of one embodiment of a computer pointing device 12 of the present invention. The computer pointing device 12 includes at least one inaudible moveable input 14 which performs an inaudible "click" upon actuation. Actuation of the inaudible moveable input 14 occurs when the user applies an input force F to the inaudible moveable input 14. The actuation of the inaudible moveable input 14 generates a user input signal which is communicated to the computer 10 via an interface 16. The interface 16 includes at least one electrical contact 17 for communicating input from the user to the computer 10.

The inaudible moveable input 14 includes a protrusion portion 18 fixedly positioned such that the point of cooperation or engagement between the protrusion portion 18 and a resilient member 20 is proximate to the interface 16. The resilient member 20 includes at least one electrical contact 19. This fixed position of the protrusion portion 18 is located proximate to the interface 16, providing for the inaudible engagement and disengagement of the electrical contacts 17, 19 of the resilient member 20 in cooperation with the interface 16. This position of the protrusion portion 18 relative to the resilient member 20 provides for inaudible engagement and disengagement and eliminates the audible "click" associated with a user input into a traditional computer pointing device.

In one embodiment, the inaudible moveable input 14 comprises a button. The user depresses the button to generate a selection signal. Due to the configuration of the resilient member 20 and the protrusion portion 18, the depression of the button is silent.

Figure 3:
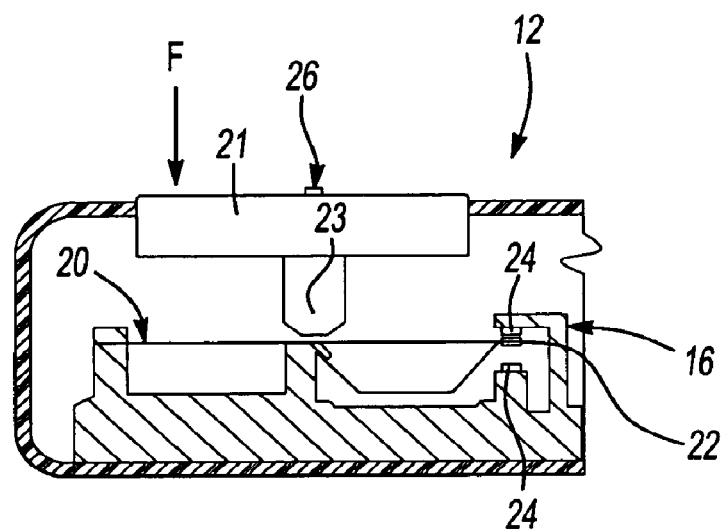
FIG. 3 illustrates a side view, partially cut-away, of another embodiment of a computer pointing device incorporating the present invention.

FIG. 3 illustrates a side view, partially cut-away, of another embodiment of a computer pointing device 12 of the present invention. The computer pointing device 12 includes at least one user input member 21 which selectively generates an inaudible or an audible "click" upon actuation. Actuation of the input member 21 occurs when the user applies an input force F to the input member 21. The actuation of the input member 21 generates a user input signal which is communicated to the computer 10 via the interface 16 as described above. The input member 21 includes a switch 26 that is operable to selectively switch between an inaudible and audible generation of the user input signal to the computer 10. The position of the switch 26 selectively controls the point of cooperation or engagement between the input member 21 and the resilient member 20. The switch 26 controls movement of a protrusion 23 relative to the resilient member 20 to change between inaudible and audible modes. Based upon this movement of the point of engagement between the protrusion 23 and the resilient member 20, actuation of the inaudible moveable input 14 will selectively change the inaudible "click" to an audible "click."

The operation of the protrusion 23 and resilient member 20 is similar to that described above with regard to FIG. 2. A user moves the input member 21, which causes the protrusion 23 to depress the resilient member 20. The resilient member 20 includes at least one resilient member electrical contact 22 and the interface 16 includes at least one interface electrical contact 24. The actuation of the resilient member 20 by the input member 21, selectively engages and disengages contact between the resilient member electrical contact 22 and the interface electrical contact 24 providing communication from the input member 21 to the computer 10.

Figure 4:
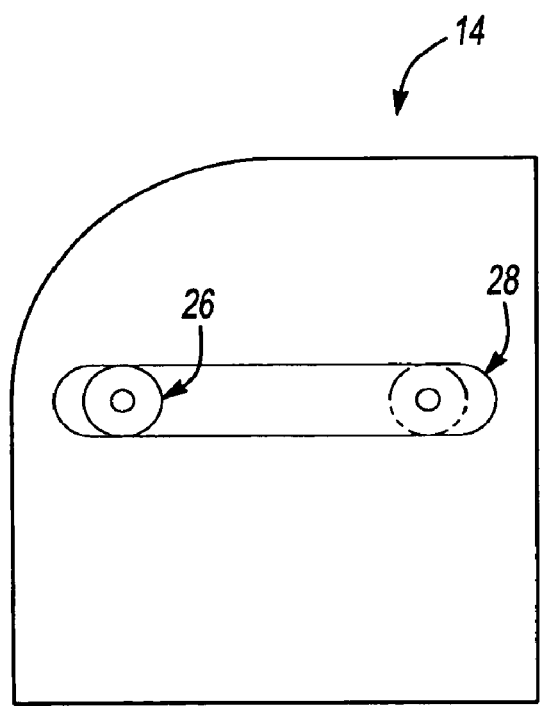
FIG. 4 illustrates a schematic view of a switch and input portion of the computer pointing device of the present invention.

FIG. 4 further illustrates the switch 26 for converting the inaudible engagement between the resilient member electrical contact 22 and the interface electrical contact 24 to an audible engagement. The switch 26, operably coupled to the input member 21, is selectively moveable within a guide 28 incorporated into the input member 21. The switch 26 moves the point of contact between the protrusion 23 and the resilient member 20 from a first position A to a second position B to respectively convert the audible engagement and disengagement of the resilient member electrical contact 22 to the interface electrical contact 24 to an inaudible engagement and disengagement as illustrated in FIG. 5.

Figure 5:
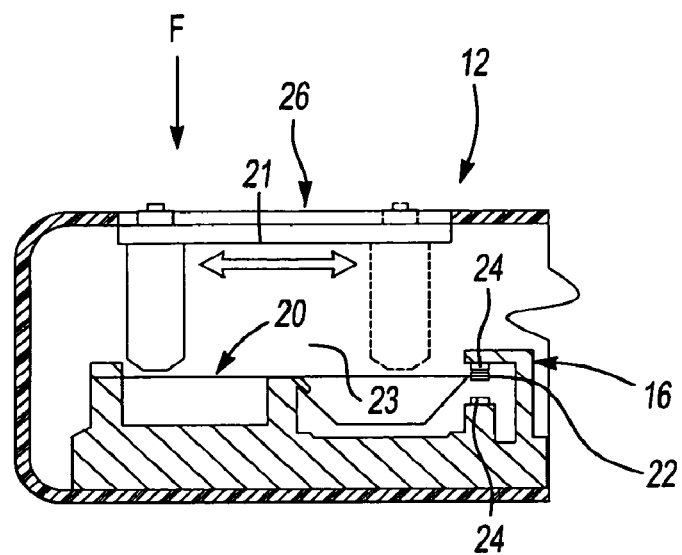
FIG. 5 illustrates a detailed view of the computer pointing device of FIG. 3.

Furthermore, as shown in FIG. 5, the resilient member 20 comprises a cantilever spring 42 having a first end 44 held fixed relative to the interface 16 and a second end 46 moveable relative to the interface 16. The resilient member electrical contact 22 is positioned at the second end 46 of the resilient member 20. When the switch 26 is in the inaudible position B, the position 23 is positioned closer to the resilient member electrical contact 22 than when in audible position A. Thus, when in position B, the protrusion 23 is located proximate to the second end 46 of the resilient member 20. Conversely, when the protrusion is in position A, the protrusion 23 is located proximate to the first end 44 of the resilient member 20.

Figure 6:
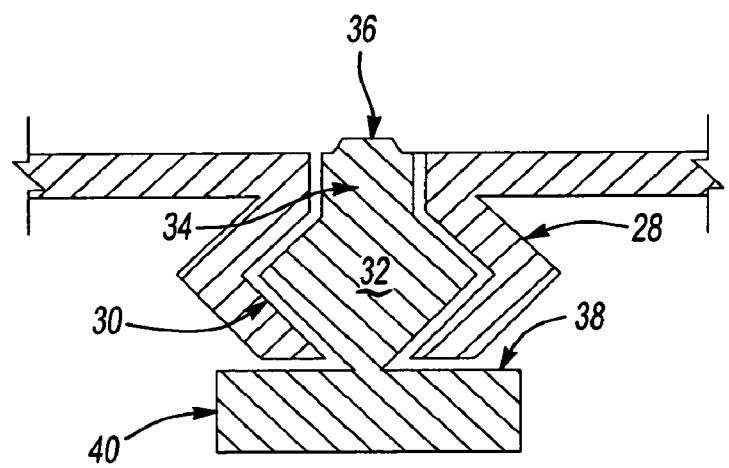
FIG. 6 illustrates one embodiment of the switch shown in FIG. 4.
Figure 6:
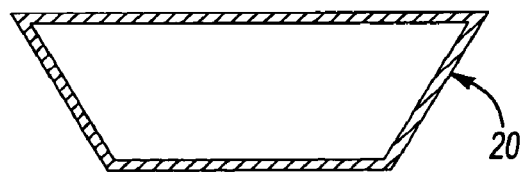

In one embodiment, as illustrated in FIG. 6, the guide 28 is a track 30 and the protrusion 23 includes a center body portion 32 and a knob 34 having an upper surface 36 for selective tactile engagement by a user. The center body portion 32 is slidably received within the track 30. A bottom surface 38 includes a protrusion 40 extending toward the resilient member 20. The center body portion 32 comprises a slide received within the track 30 to selectively move the protrusion 40 between the audible position A and the inaudible position B.

Further, a method of operating a computer pointing device 12 is also disclosed. The method includes inaudibly activating a moveable user input 14 to communicate a user signal to a computer 10. This method may also include the step of switching between an inaudible movement and audible movement of the input 21. Switching between audible and inaudible modes of operation involves moving the position of the protrusion 23, supported by the input member 21, relative to the resilient member 20.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A computer pointing device comprising:
an inaudible moveable input;
an interface to communicate user input from the inaudible moveable input to a computer, the interface including at least one interface electrical contact;

at least one resilient member having at least one resilient member electrical contact for selective engagement with said interface electrical contact; and a switch operably coupled to said inaudible moveable input for converting inaudible engagement between said resilient member and interface electrical contacts into audible engagement between said resilient member and interface electrical contacts.

2. The device of claim 1 wherein said inaudible moveable input generates a user input signal that is communicated to a computer.

3. The device of claim 2 wherein said at least one resilient member is responsive to movement of said inaudible moveable input.

4. The device of claim 1 wherein said switch is selectively switchable between an audible mode and an inaudible mode.

5. The device of claim 4 wherein said at least one resilient member is moveable between an engaged position and a disengaged position with said interface and wherein contact between said at least one resilient member and said interface is inaudible when said switch is operating in said inaudible mode.

6. The device of claim 4 wherein said inaudible moveable input comprises a button on a mouse and wherein activation of said button is silent when said switch is operating in said inaudible mode.

7. A computer pointing device comprising:
an interface for communicating user input to a computer and including at least one interface electrical contact;
at least one resilient member including at least one resilient member electrical contact for selective engagement with said at least one interface electrical contact;
at least one user input member cooperating with said at least one resilient member to selectively engage and disengage said at least one resilient member electrical contact from said at least one interface electrical contact wherein said at least one resilient member electrical contact inaudibly engages said at least one interface electrical contact in response to user input to said at least one input member; and
a switch operably coupled to said at least one input member for converting inaudible engagement between said at least one resilient member and interface electrical contacts into audible engagement between said at least one resilient member and interface electrical contacts.

8. The device of claim 7 wherein said switch switches said at least one user input member between an audible click position and an inaudible click position.

9. The device of claim 8 wherein said switch comprises a guide cooperating with said at least one user input member to move said at least one user input member relative to said at least one resilient member as said at least one user input member moves between said audible and inaudible click positions.

10. The device of claim 9 wherein said guide comprises a track and said at least one user input member comprises a tactile input having an upper surface for selective tactile engagement by a user and a bottom surface supporting a protrusion extending toward said at least one resilient member, said protrusion being slidably received within said track.

11. The device of claim 10 wherein said tactile input includes a knob operably coupled to said protrusion to move said protrusion between said audible and inaudible click positions.

12. The device of claim 9 wherein said at least one user input member is closer to said at least one resilient member electrical contact in said inaudible click position than in said audible click position.

13. A computer pointing device comprising:
an interface for communicating user input to a computer and including at least one interface electrical contact;
at least one resilient member including at least one resilient member electrical contact for selective engagement with said at least one interface electrical contact wherein said at least one resilient member comprises a cantilever spring having a first end held fixed relative to said interface and a second end moveable relative to said interface, said at least one resilient member electrical contact being positioned at said second end; and
at least one user input member cooperating with said at least one resilient member to selectively engage and disengage said at least one resilient member electrical contact from said at least one interface electrical contact wherein said at least one resilient member electrical contact inaudibly engages said at least one interface electrical contact in response to user input to said at least one user input member.

* * * * *